(12) United States Patent
Himmelmann

(10) Patent No.: US 11,286,887 B2
(45) Date of Patent: Mar. 29, 2022

(54) PNEUMATIC CIRCUIT BREAKER BASED SELF RESETTING PASSIVE OVERSPEED CONTROL VALVE FOR TURBINE PUMP ASSEMBLY

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 817 days.

(21) Appl. No.: 14/695,082

(22) Filed: Apr. 24, 2015

(65) Prior Publication Data
US 2016/0312743 A1    Oct. 27, 2016

(51) Int. Cl.
| | | |
|---|---|---|
| F02K 9/58 | (2006.01) | |
| F04D 15/00 | (2006.01) | |
| F04D 13/04 | (2006.01) | |
| F02K 9/80 | (2006.01) | |
| F02C 7/32 | (2006.01) | |
| F02K 9/92 | (2006.01) | |
| F02K 9/48 | (2006.01) | |
| F02K 9/56 | (2006.01) | |

(52) U.S. Cl.
CPC .......... *F02K 9/58* (2013.01); *F02C 7/32* (2013.01); *F02K 9/48* (2013.01); *F02K 9/563* (2013.01); *F02K 9/566* (2013.01); *F02K 9/805* (2013.01); *F02K 9/92* (2013.01); *F04D 13/04* (2013.01); *F04D 15/0066* (2013.01); *F04D 15/0077* (2013.01); *F05D 2260/38* (2013.01); *F05D 2270/021* (2013.01); *F05D 2270/42* (2013.01)

(58) Field of Classification Search
CPC . F02C 7/32; F02K 9/563; F02K 9/566; F02K 9/48; F02K 9/92; F04D 13/04; F04D 13/043; F04D 15/0022; F04D 15/0066; F04D 15/0077; F02B 37/12; F02B 37/18; F02B 37/183; F02B 37/186
USPC ................. 60/602; 251/212; 137/219, 220
See application file for complete search history.

(56) References Cited

U.S. PATENT DOCUMENTS

| | | | |
|---|---|---|---|
| 3,052,252 A | 9/1962 | Laucks | |
| 3,082,600 A * | 3/1963 | Williamson | F02K 9/563 310/15 |
| 3,208,216 A * | 9/1965 | Silvern | B64G 1/42 60/39.17 |
| 3,895,646 A * | 7/1975 | Howat | F16K 17/38 137/468 |
| 4,165,795 A | 8/1979 | Lynch et al. | |
| 8,191,571 B2 * | 6/2012 | Himmelmann | B64G 6/00 137/504 |

(Continued)

FOREIGN PATENT DOCUMENTS

WO    2014174285 A2    10/2014

*Primary Examiner* — Todd E Manahan
*Assistant Examiner* — Kyle Robert Thomas
(74) *Attorney, Agent, or Firm* — Carlson, Gaskey & Olds, P.C.

(57) ABSTRACT

A turbine pump assembly has a turbine, a centrifugal pump, a passive electrical speed control system, and a pneumatic circuit breaker. The pneumatic circuit breaker has a plurality of elements that are configured to move to a position blocking an outlet duct of the turbine when a flow velocity exceeds a predetermined threshold. A rocket thrust vector control system is also disclosed.

20 Claims, 6 Drawing Sheets

(56) References Cited

U.S. PATENT DOCUMENTS

| | | | | |
|---|---|---|---|---|
| 8,572,948 | B1* | 11/2013 | Pinera | F02K 9/50 239/127.1 |
| 9,512,790 | B2* | 12/2016 | Nagar | F02D 41/0007 |
| 2009/0211247 | A1* | 8/2009 | McEwan | F01N 11/002 60/602 |
| 2009/0257888 | A1* | 10/2009 | Harrington | F02K 9/46 417/53 |
| 2010/0064656 | A1* | 3/2010 | Lopez | F01D 9/02 60/39.24 |
| 2013/0227931 | A1* | 9/2013 | Danguy | F02K 9/46 60/246 |
| 2014/0037423 | A1* | 2/2014 | Weber | B64D 41/007 415/1 |
| 2014/0174076 | A1 | 6/2014 | VanDyne et al. | |

\* cited by examiner

PNEUMATIC CIRCUIT BREAKER BASED SELF RESETTING PASSIVE OVERSPEED CONTROL VALVE FOR TURBINE PUMP ASSEMBLY

BACKGROUND

This application relates to a turbine pump assembly, and more particularly to a pneumatic circuit breaker control valve for a turbine pump assembly.

Rockets are maneuvered by vectoring the rocket engine thrust direction. A thrust vector control system often relies on hydraulic rams to displace the engine nozzle angle. Such hydraulic rams require high pressure hydraulic fluid pumping systems, capable of providing very high flow rates. This hydraulic flow is typically generated by a Turbine Pump Assembly (TPA), which may be powered by a fluid propellant provided by the main engine turbo-pump assembly.

A traditional TPA comprises a turbine and a hydraulic pump. Typically, the turbine operates at very high rotational speeds, such as 115,000 rpm, while the hydraulic pump operates at lower speeds, such as 6100 rpm. A gear reduction system is incorporated between the hydraulic pump and the turbine to accommodate the different operating speeds.

A traditional TPA further includes a Turbine Speed Control Valve Assembly to control the fluid flowing to the turbine, and thus the turbine rotational speed. The output power of the turbine is proportional to the mass flow rate of the propellant through the valve. In traditional systems, this valve assembly comprises a spring and a fly weight governor assembly. As the turbine spins, the fly weight governor assembly also rotates. As the fly weight governor rotates, a centripetal force is applied to arms of the fly weight governor, proportional to the rotational speed of the turbine. When the turbine and fly weight governor reach a particular speed, the fly weight governor arms push against the spring, causing the valve to partially close. As the turbine spins faster, the valve is pushed further closed. When the turbine reaches a desired speed, the fly weight governor forces are balanced against the spring force, with the valve open just far enough to maintain the turbine speed.

If additional load is applied to the TPA by the hydraulic system, the turbine will decelerate. When the turbine slows down, the centripetal force acting on the fly weight governor arms is reduced, allowing the spring to push the valve further open, allowing more propellant to flow into the turbine, causing the turbine to speed back up to the desired speed. This system is well developed, but also complex and expensive.

SUMMARY

A turbine pump assembly has a turbine, a centrifugal pump, a passive electrical speed control system, and a pneumatic circuit breaker. The pneumatic circuit breaker has a plurality of elements that are configured to move to a position blocking an outlet duct of the turbine when a flow velocity exceeds a predetermined threshold. A rocket thrust vector control system is also disclosed.

The various features and advantages of this invention will become apparent to those skilled in the art from the following detailed description of an embodiment. The drawings that accompany the detailed description can be briefly described as follows.

DETAILED DESCRIPTION

Figure 1:
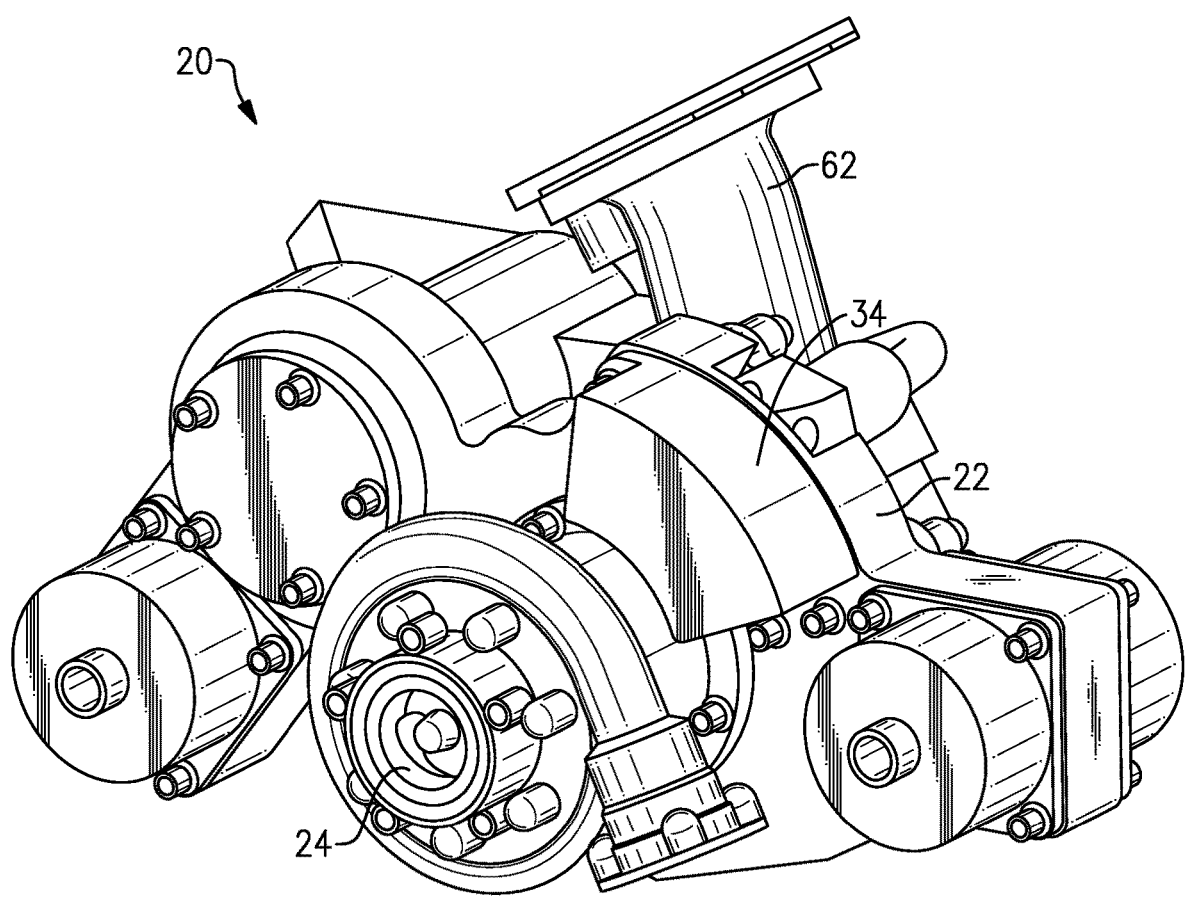
FIG. 1 shows a perspective view of a turbine pump assembly.

Referring to FIG. 1, a turbine pump assembly (TPA) system 20 includes a turbine 22 and a centrifugal pump 24. The TPA 20 may be powered by a propellant, such as hydrogen gas, provided by the main engine turbo-pump assembly 29 (shown in FIG. 2). Other propellants are contemplated, such as oxygen, methane, helium, or nitrogen, for example. The centrifugal pump 24 allows the TPA 20 to be much smaller than the traditional system that utilizes a hydraulic pump.

Figure 2:
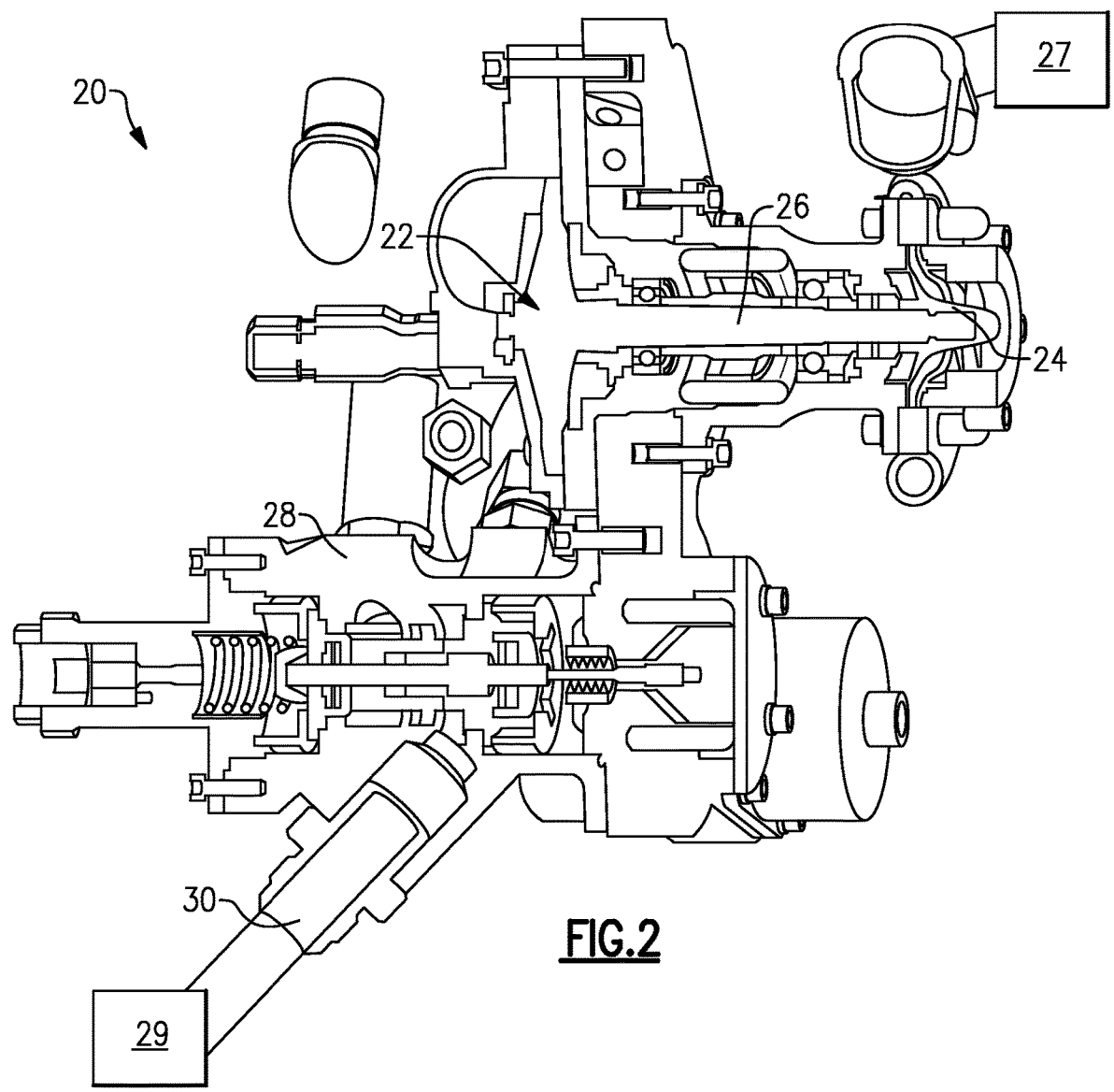
FIG. 2 shows a cross section of the turbine pump assembly of FIG. 1.

Both the turbine 22 and centrifugal pump 24 are capable of operating at very high speeds, and thus are configured to rotate on a single shaft 26, as shown in FIG. 2. In one example, the operating speed of the turbine 22 and centrifugal pump 24 is between 90,000 rpm and 140,000 rpm. The turbine 22 drives the centrifugal pump 24 through the shaft 26. Hydraulic fluid from the centrifugal pump 24 is communicated to a rocket engine nozzle 27 (shown schematically) to displace an engine nozzle angle relative to a rocket core axis. The operation of the engine nozzle 27 and how the angle is adjusted are known.

Although disclosed as part of a rocket engine nozzle control, this disclosure may have application in other systems.

Since the turbine 22 and centrifugal pump 24 both operate at high speeds, and thus can operate on the same shaft 26, a gear reduction between the turbine 22 and the centrifugal pump 24 is not required. This configuration results in fewer moving parts in the overall system than a traditional TPA. The higher speeds of the single shaft 26 also prohibit the use of the fly weight governor used in traditional systems.

A speed control valve 28 controls the amount of propellant that goes to the turbine 22 from a main engine turbo-pump assembly 29 (shown schematically) through a turbine gas inlet port 30. When propellant is supplied to the turbine gas inlet port 30, propellant flows through the speed control valve 28 and to the turbine 22, causing the turbine 22 to rotate. As the mass flow rate of the propellant increases, the speed of the turbine 22 will increase. The speed control valve 28 controls the speed of the turbine 22 by varying the mass flow rate of the propellant.

Figure 3:
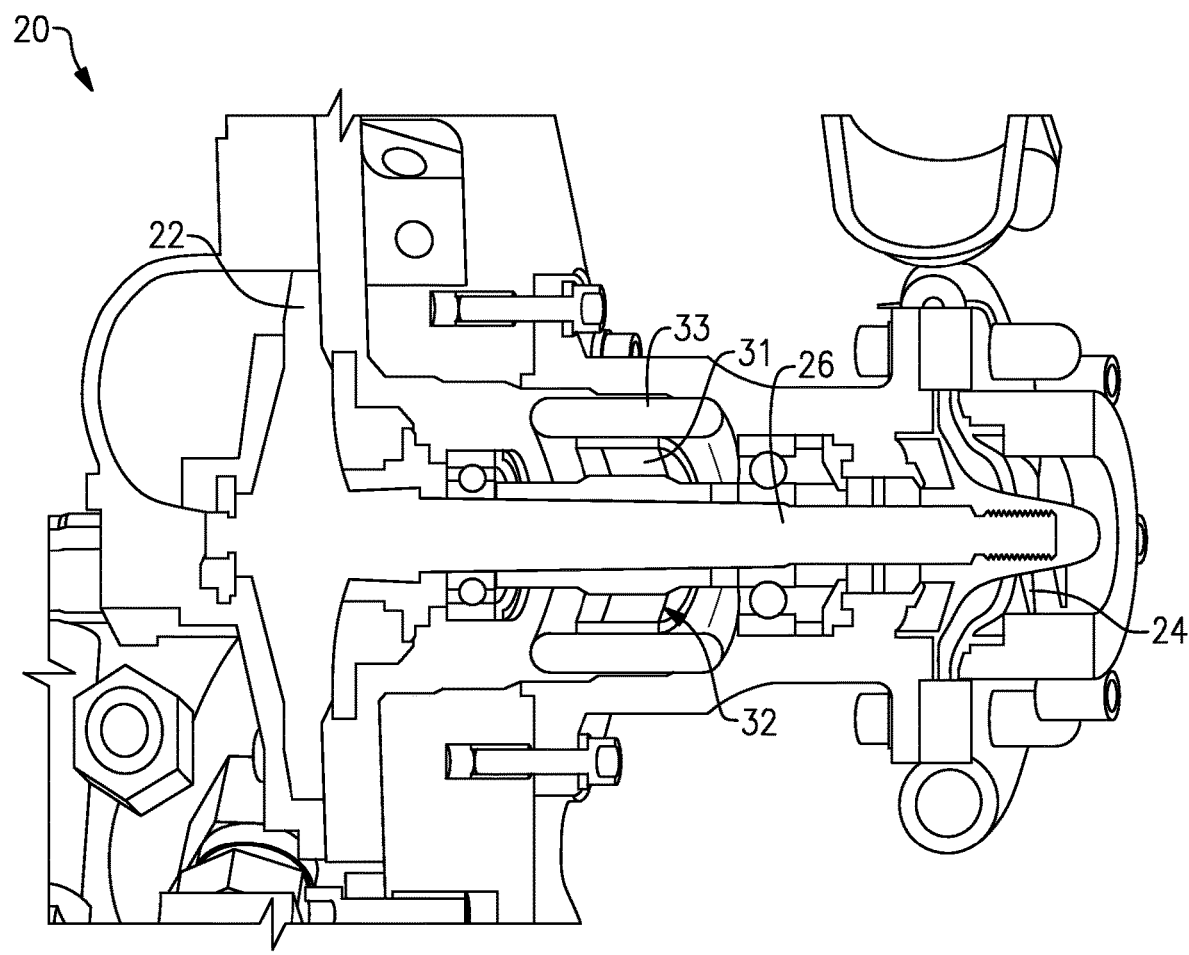
FIG. 3 shows a partial view of a portion of the turbine pump assembly of FIG. 1.

FIG. 3 shows the rotating components of the TPA 20. A generator 32 is arranged along the shaft 26 between the turbine 22 and the centrifugal pump 24. In one embodiment, the generator 32 is a high speed permanent magnet generator. In the illustrated embodiment, the generator 32 comprises permanent magnets 31 that rotate with the shaft 26, and generate a current in a stationary coil 33. The permanent magnet generator 32 generates alternating current power proportional to the rotational speed of the turbine 22. This alternating current power is passively rectified by a passive rectifier 34 (shown in FIG. 1) into direct current power proportional to the rotational speed of the turbine 22, which is then used to control the speed of the turbine 22.

Figure 4:
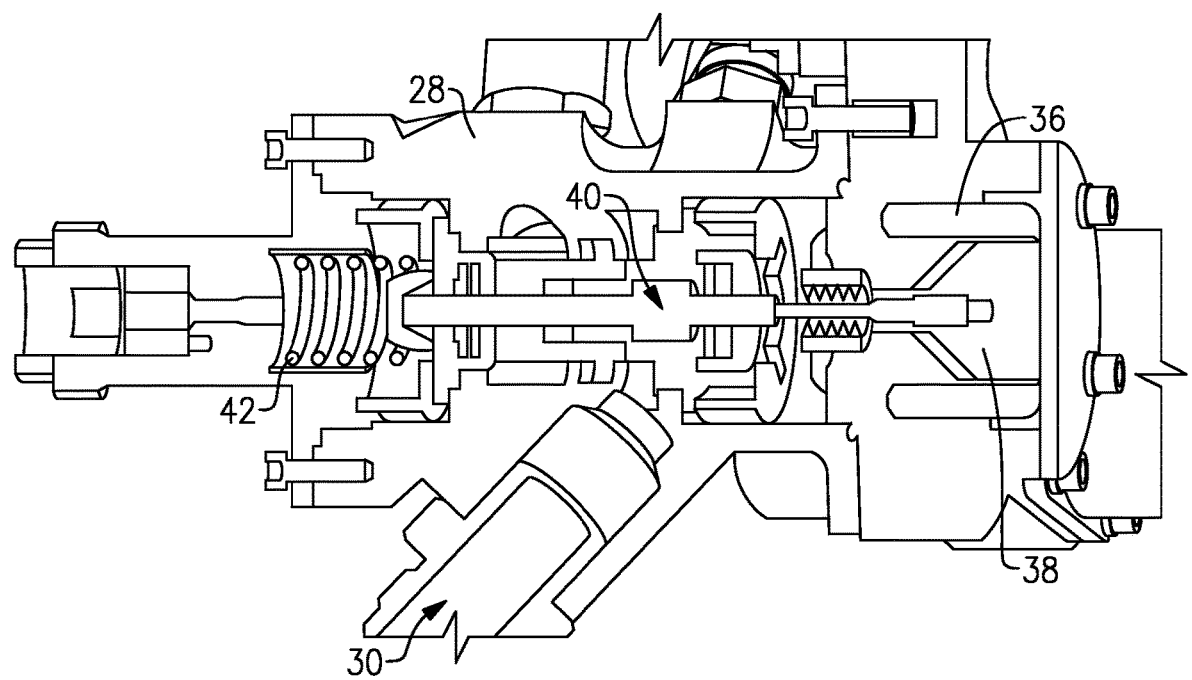
FIG. 4 shows a partial view of a portion of the turbine pump assembly of FIG. 1.

FIG. 4 shows the turbine speed control valve assembly 28, which provides passive electrical proportional turbine speed control. In the illustrated embodiment, the direct current power from the passive rectifier 34 is sent to a valve control solenoid 36. The solenoid 36 produces an electromagnetic force applied to a valve control solenoid plunger 38, which exerts an axial force that is proportional to the direct current power that is flowing in the windings of solenoid 36. Because the direct current power is proportional to the speed of the turbine 22, the axial force produced by solenoid 36 is also proportional to the speed of the turbine 22. This axial force exerted by the plunger 38 pushes against a valve spool 40, which pushes against a valve opening spring 42. In another embodiment, a linear motor or electromechanical actuator may be used to displace the valve spool 40. In the shown example, the axial force exerted by plunger 38 causes the valve spool 40 to shift to the left, compressing the valve opening spring 42 and decreasing the mass flow rate of the propellant entering the turbine 22 through the turbine inlet port 30. Details of the passive electrical speed control system are found in co-pending U.S. patent application Ser. No. 14/695,073, entitled "Passive Electrical Proportional Turbine Speed Control System" filed on even date herewith. Details of an overspeed control system are found in co-pending U.S. patent application Ser. No. 14/695,079, entitled "Passive Overspeed Controlled Turbo Pump Assembly" filed on even date herewith.

As the turbine 22 spins faster, more alternating current power is generated at the permanent magnet generator 32, creating more direct current power rectified by the passive rectifier 34. As direct current power in the valve control solenoid 36 increases, the electromagnetic force applied to the valve control solenoid plunger 38 increases. The increased electromagnetic force results in an increased axial force exerted by the plunger 38. The increased axial force exerted by the plunger 38 pushes the valve spool 40, which pushes the spring 42 to push the valve 28 further closed, which decreases the mass flow rate of propellant entering the turbine 22, thus decreasing the speed of the turbine 22. When the turbine 22 reaches a desired speed, the axial force generated by the valve control solenoid 36 is balanced with the spring force of spring 42, such that the valve 28 is open just far enough to maintain a desired speed of the turbine 22.

As the speed of the turbine 22 decreases, the electromagnetic force applied to the valve control solenoid plunger 38 decreases, causing the valve spool 40 to shift in the opposite direction, decompressing the valve opening spring 42. When the valve opening spring 42 is decompressed, the mass flow rate of propellant entering the turbine 22 through turbine gas inlet port 30 increases. The desired mass flow rate and turbine speed depend on the requirements of a particular system.

Figure 5:
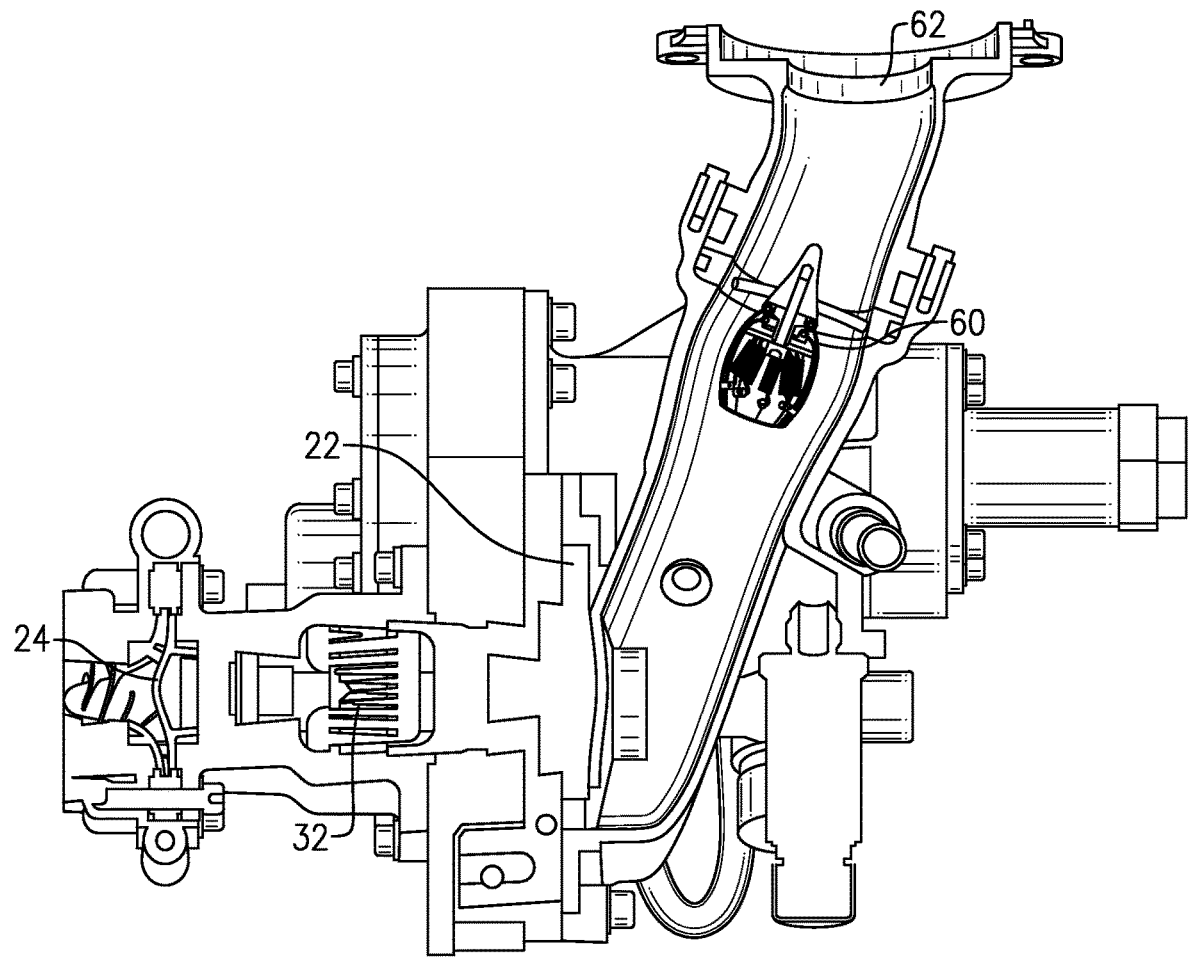
FIG. 5 shows a cross section of the turbine pump assembly of FIG. 1.

If the turbine speed control valve assembly 28 fails, the turbine 22 may accelerate to undesirable speeds. FIG. 5 shows a pneumatic circuit breaker 60 in an open position located in an outlet duct 62 of the turbine 22. The pneumatic circuit breaker 60 is designed to allow flow below a certain flow velocity to pass by with very little pressure drop. In one embodiment, the circuit breaker 60 is of a circumferential airfoil or teardrop shape in the open position.

Figure 6:
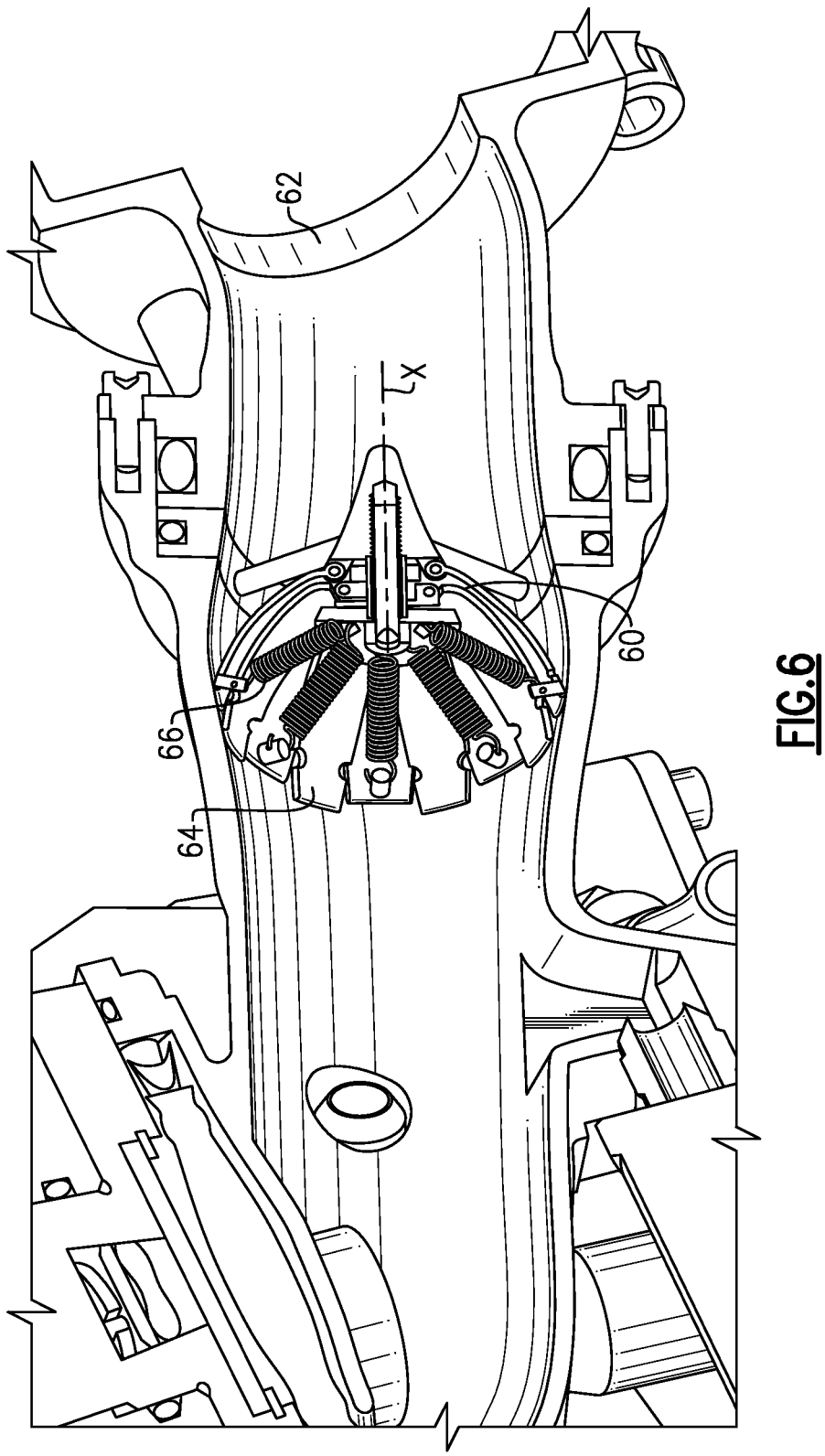
FIG. 6 shows a partial view of a portion of the turbine pump assembly of FIG. 5.

FIG. 6 shows the pneumatic circuit breaker 60 in a closed position. The circuit breaker 60 includes a plurality of elements 64 defined about an axis X. In one embodiment, a plurality of springs 66 permit the plurality of elements 64 to move between the open position and the closed position. The plurality of springs 66 are sized to keep the circuit breaker 60 in the open position when the TPA 20 is in normal operation. The closed position occurs above a predetermined flow velocity of fluid in the outlet duct 62, and the open position occurs below the predetermined flow velocity of the fluid in the outlet duct 62. In one embodiment, the circuit breaker 60 is of a cup shape in the closed position.

When the circuit breaker 60 is in the open position, a certain mass flow rate of propellant will pass through the turbine 22 and turbine outlet duct 62. The propellant causes the turbine 22 to rotate, and the centrifugal pump 24 extracts work from the turbine 22, which causes the propellant to cool down, increasing its density and reducing the volumetric flow rate of the propellant in the turbine outlet duct 62. However, if the passive electrical control system and/or the hydraulic system fails, and an inlet pressure to the centrifugal pump 24 drops below a required pressure, the centrifugal pump will become unloaded. If the centrifugal pump 24 is unloaded, it stops extracting work from the turbine 22, causing the turbine 22 to become unloaded, which may allow the turbine 22 to accelerate to undesirable speeds. When the turbine 22 becomes unloaded, it will stop removing heat from the propellant, which causes the temperature of the propellant to increase, which causes an increase in the volumetric flow rate of the propellant in the turbine outlet duct 62. If the flow rate of propellant passing by the pneumatic circuit breaker 60 exceeds a pre-determined value, the pressure difference between the stagnation pressure within the pneumatic circuit breaker 60 and the dynamic pressure flowing around the circuit breaker 60 will cause the circuit breaker 60 to rapidly close.

When the circuit breaker 60 rapidly closes, the back pressure at the turbine 22 will rapidly increase, causing the mass flow rate of propellant in the outlet duct 62 to drop to nearly zero. This drop will cause the turbine 22 to stop operating. Once an operator corrects the failure and manually removes the pressure at an inlet of the turbine 22, the plurality of springs 66 will automatically reset the pneumatic circuit breaker 60 to the open position.

The pneumatic circuit breaker 60 positioned in the outlet duct 62 protects the TPA 20 from damage due to a failure of the passive electrical turbine speed control and/or the hydraulic fluid supply system. When the circuit breaker 60 is closed, the TPA 20 will be safely shut down. Once the TPA 20 is shut down, the circuit breaker 60 will automatically reset once the other failures are remedied, allowing for immediate startup.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A turbine pump assembly, comprising:
a turbine configured to drive a centrifugal pump;
a passive electrical speed control system configured to limit a speed of the turbine; and
a pneumatically actuated circuit breaker arranged in an outlet duct of the turbine having a plurality of elements that are configured to move to a position blocking the outlet duct when a flow velocity exceeds a predetermined threshold, wherein the circuit breaker has at least one spring attached to at least one of the plurality of elements, and the spring holds the at least one element in a closed position when the flow velocity is below the predetermined threshold.

2. The turbine pump assembly of claim 1, wherein the pneumatically actuated circuit breaker defines a teardrop shape when the plurality of elements are in a closed position.

3. The turbine pump assembly of claim 1, wherein the turbine is powered by a propellant provided by a main engine turbo-pump of a vehicle.

4. The turbine pump assembly of claim 3, wherein the propellant is hydrogen gas.

5. The turbine pump assembly of claim 1, wherein the passive electrical speed control system further comprises a valve configured to meter a flow of propellant to the turbine.

6. The turbine pump assembly of claim 1, wherein the passive electrical speed control system comprises a permanent magnet generator and a valve control solenoid.

7. The turbine pump assembly of claim 1, wherein the predetermined threshold is a flow velocity that will occur when the turbine is in an unloaded condition.

8. The turbine pump assembly of claim 1, wherein the pneumatically actuated circuit breaker is configured to automatically reset to a closed position when pressure in the turbine pump assembly is reduced.

9. The turbine pump assembly of claim 1, wherein the pneumatically actuated circuit breaker is a passive circuit breaker.

10. The turbine pump assembly of claim 1, wherein the plurality of elements are configured to move in response to a pressure difference between a stagnation pressure within the pneumatically actuated circuit breaker and a pressure of flow around the pneumatically actuated circuit breaker.

11. The turbine pump assembly of claim 1, wherein the predetermined threshold is a flow velocity that will occur when the passive electrical turbine speed control fails.

12. The turbine pump assembly of claim 1, wherein the turbine is configured to stop operating when the plurality of elements are in the position blocking the outlet duct.

13. The turbine pump assembly of claim 1, wherein the turbine and the centrifugal pump are configured to rotate between 90,000 rpm and 140,000 rpm on a common shaft.

14. A rocket thrust vector control system, comprising:
an engine nozzle configured to receive fluid from a centrifugal pump;
a turbine pump assembly having a turbine configured to drive the centrifugal pump, a passive electrical speed control system configured to limit a speed of the turbine; and
a pneumatically actuated circuit breaker arranged in an outlet duct of the turbine, wherein the circuit breaker has a plurality of elements configured to move to a position blocking the outlet duct when a flow velocity exceeds a predetermined threshold, wherein the circuit breaker has at least one spring attached to at least one of the plurality of elements, and the spring holds the at least one element in a closed position when the flow velocity is below the predetermined threshold.

15. The rocket thrust vector control system as recited in claim 14, wherein the predetermined threshold is a flow velocity that occurs when the turbine is in an unloaded condition.

16. The rocket thrust vector control system as recited in claim 14, wherein the turbine is powered by a propellant provided by a main engine turbo-pump of a vehicle.

17. The rocket thrust vector control system of claim 14, wherein the pneumatically actuated circuit breaker is configured to automatically reset to a closed position when pressure in the turbine pump assembly is reduced.

18. The rocket thrust vector control system of claim 14, wherein the pneumatically actuated circuit breaker is a passive circuit breaker.

19. The rocket thrust vector control system of claim 14, wherein the at least one element is configured to move in response to a pressure difference between a stagnation pressure within the pneumatically actuated circuit breaker and a pressure of flow around the pneumatically actuated circuit breaker.

20. The rocket thrust vector control system of claim 14, wherein the predetermined threshold is a flow velocity that will occur when the passive electrical turbine speed control fails.

* * * * *